US012683876B2

(12) United States Patent
Mermoud et al.

(10) Patent No.: US 12,683,876 B2
(45) Date of Patent: Jul. 14, 2026

(54) CONVERSATIONAL NETWORK ASSURANCE USING LARGE LANGUAGE MODELS

(71) Applicant: Cisco Technology, Inc., San Jose, CA (US)

(72) Inventors: Grégory Mermoud, Venthône (CH); Jean-Philippe Vasseur, Combloux (FR); Pierre-André Savalle, Rueil-Malmaison (FR); Eduard Schornig, Haarlem (NL); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/205,063

(22) Filed: Jun. 2, 2023

(65) Prior Publication Data

US 2024/0406081 A1     Dec. 5, 2024

(51) Int. Cl.
*H04L 41/5074* (2022.01)
*H04L 41/16* (2022.01)
*H04L 41/5067* (2022.01)

(52) U.S. Cl.
CPC .......... *H04L 41/5074* (2013.01); *H04L 41/16* (2013.01); *H04L 41/5067* (2013.01)

(58) Field of Classification Search
CPC .. H04L 41/5067; H04L 41/5074; H04L 41/16
See application file for complete search history.

(56) References Cited

U.S. PATENT DOCUMENTS

| | | | | |
|---|---|---|---|---|
| 10,050,868 | B2 * | 8/2018 | Porras ................. | H04L 63/1491 |
| 10,762,113 | B2 * | 9/2020 | Jia ........................... | G10L 15/22 |
| 12,040,934 | B1 * | 7/2024 | Wang ...................... | H04L 41/16 |
| 2018/0032576 | A1 * | 2/2018 | Romero ................. | G06F 21/31 |
| 2018/0053119 | A1 | 2/2018 | Zeng et al. | |
| 2020/0106881 | A1 * | 4/2020 | Beaver ................... | H04L 51/02 |
| 2020/0175304 | A1 * | 6/2020 | Vig .................. | G06F 16/24522 |
| 2020/0327892 | A1 * | 10/2020 | Fox ........................ | G10L 15/22 |
| 2021/0281492 | A1 * | 9/2021 | Di Pietro ................ | H04L 41/16 |
| 2022/0189460 | A1 * | 6/2022 | Fang ....................... | H04L 51/02 |
| 2022/0232126 | A1 * | 7/2022 | Naidu ..................... | H04L 51/02 |
| 2023/0074406 | A1 * | 3/2023 | Baeuml ............. | G06F 16/90332 |
| 2023/0185799 | A1 * | 6/2023 | Hoang ............. | G06F 16/24522 |
| | | | | 704/2 |

(Continued)

OTHER PUBLICATIONS

"Introducing ChatGPT", online: https://openai.com/blog/chatgpt, accessed May 31, 2023, 10 pages.

(Continued)

*Primary Examiner* — Nam T Tran
(74) *Attorney, Agent, or Firm* — Lee & Hayes, P.C.

(57)     ABSTRACT

In one embodiment, a device receives, at a first large language model executed by a device, textual input from a user of a network regarding a networking issue in the network. The device issues, by the first large language model and to a second large language model, one or more questions regarding the network based on the textual input. The device receives, at the first large language model and from the second large language model, one or more answers to the one or more questions. The device generates, by the first large language model, a textual response to the textual input for presentation to the user.

20 Claims, 7 Drawing Sheets

(56) References Cited

U.S. PATENT DOCUMENTS

| | | | | |
|---|---|---|---|---|
| 2023/0199118 | A1* | 6/2023 | Koneru | G10L 15/26 |
| | | | | 379/88.01 |
| 2024/0104002 | A1* | 3/2024 | Kumar | G06F 11/3664 |
| 2024/0304184 | A1* | 9/2024 | Pieraccini | G10L 15/22 |
| 2024/0411752 | A1* | 12/2024 | Prabhakar | H04L 41/16 |

OTHER PUBLICATIONS

Collins, et al., "LaMDA: our breakthrough conversation technology", online: https://blog.google/technology/ai/lamda/, accessed May 31, 2023, 3 pages.

"Introducing LLaMA: A foundational, 65-billion-parameter large language model", online: https://ai.facebook.com/blog/large-language-model-llama-meta-ai/, accessed Feb. 24, 2023, 6 pages.

"Building safer dialogue agents", online: https://www.deepmind.com/blog/building-safer-dialogue-agents, Sep. 22, 2022, 8 pages.

"Mist Marvis Overview", online: https://www.mist.com/resources/mist-marvis-overview/, accessed May 31, 2023, 10 pages.

"Tidio", online: https://www.tidio.com/, accessed May 31, 2023, 10 pages.

"Your AI pair programmer", online: https://github.com/features/copilot, accessed May 31, 2023, 13 pages.

Ham, et al., "End-to-End Neural Pipeline for Goal-Oriented Dialogue Systems Using GPT-2", Proceedings of the 58th Annual Meeting of the Association for Computational Linguistics, pp. 583-592, Jul. 5-10, 2020, Association for Computational Linguistics.

Budzianowski, et al., "Hello, It's GPT-2—How Can I Help You? Towards the Use of Pretrained Language Models for Task-Oriented Dialogue Systems", Proceedings of the 3rd Workshop on Neural Generation and Translation (WNGT 2019), pp. 15-22, Hong Kong, China, Nov. 4, 2019, Association for Computational Linguistics.

Hosseini-Asl, et al., "A simple language model for task-oriented dialogue." 34th Conference on Neural Information Processing Systems, (NeurIPS 2020), 13 pages, Vancouver, Canada.

Ouyang, et al., "Training language models to follow instructions with human feedback", 36th Conference on Neural Information Processing Systems (NeurIPS 2022), 15 pages.

Pandey, Nishant, "Conversational AI with Large Language Models", online: https://www.netomi.com/conversational-ai-with-large-language-models, Feb. 10, 2023, 5 pages.

Sundar, et al., "cTBLS: Augmenting Large Language Models with Conversational Tables", arXiv:2303.12024v2 [cs.CL] Mar. 22, 2023, 11 pages.

* cited by examiner

CONVERSATIONAL ASSURANCE PROCESS 249

CONVERSATIONAL AGENT 402

NETWORK QUESTION & ANSWER AGENT 404

CONVERSATIONAL NETWORK ASSURANCE USING LARGE LANGUAGE MODELS

TECHNICAL FIELD

The present disclosure relates generally to computer networks, and, more particularly, to conversational network assurance using large language models.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged.

In a traditional network support model, the onus is largely placed on users to identify and report networking issues via a ticketing system. More specifically, when a user encounters a problem (e.g., a lack of connectivity, degraded performance, etc.), the user is then expected to submit a support ticket that is then routed to support personnel for review. Because of the delay in this process, some systems have employed the use of chatbots to walk a user through a series of steps or questions, to help resolve their issue. However, such chatbots are largely based on Natural Language Processing (NLP) and pattern matching, making them very limited in terms of their ability to handle complex queries and queries for which they haven't been explicitly programmed to respond.

DESCRIPTION OF EXAMPLE EMBODIMENTS

Overview

Figure 1A:
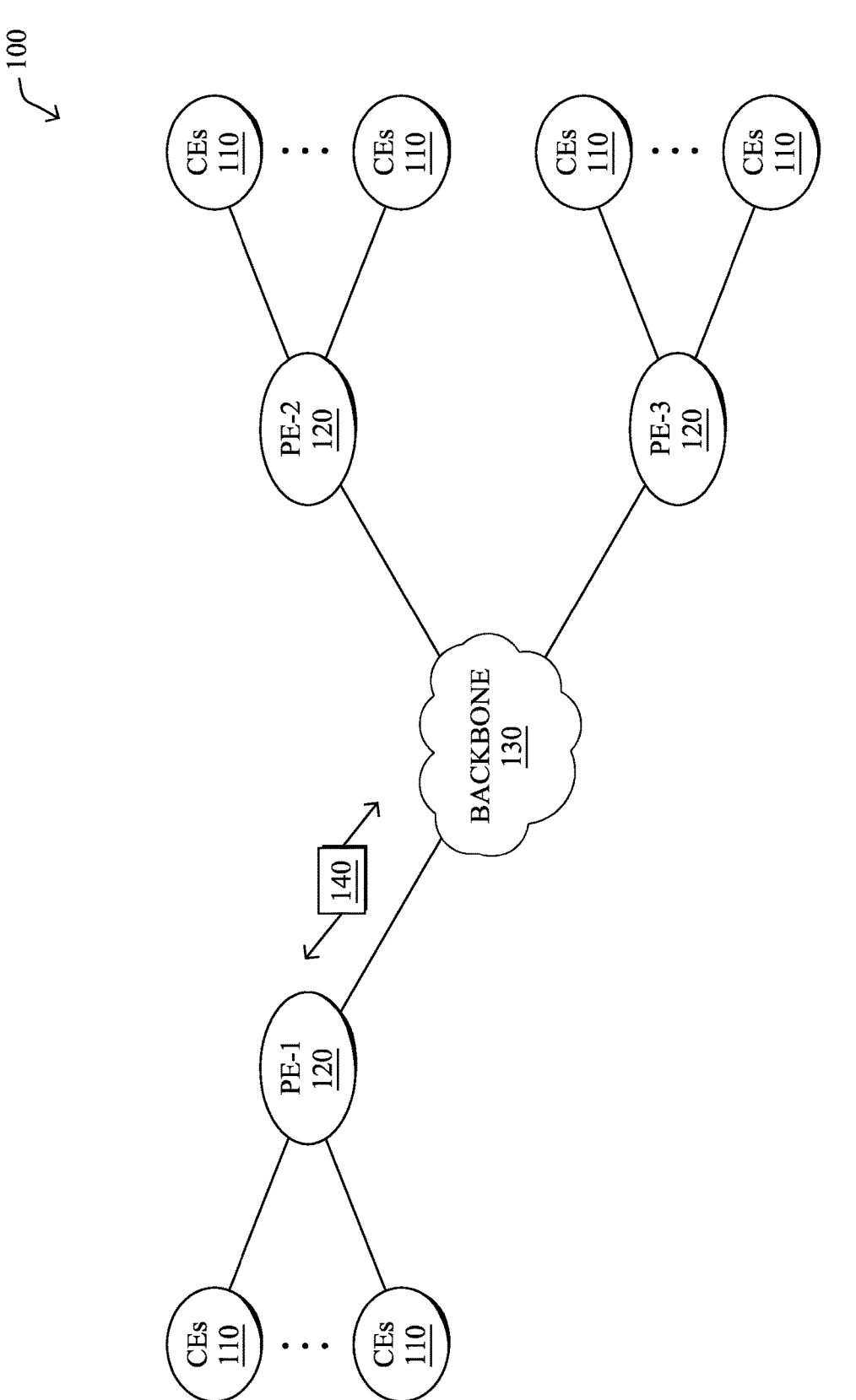
FIGS. 1A-1B illustrate an example communication network.

According to one or more embodiments of the disclosure, a device receives, at a first large language model executed by a device, textual input from a user of a network regarding a networking issue in the network. The device issues, by the first large language model and to a second large language model, one or more questions regarding the network based on the textual input. The device receives, at the first large language model and from the second large language model, one or more answers to the one or more questions. The device generates, by the first large language model, a textual response to the textual input for presentation to the user.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
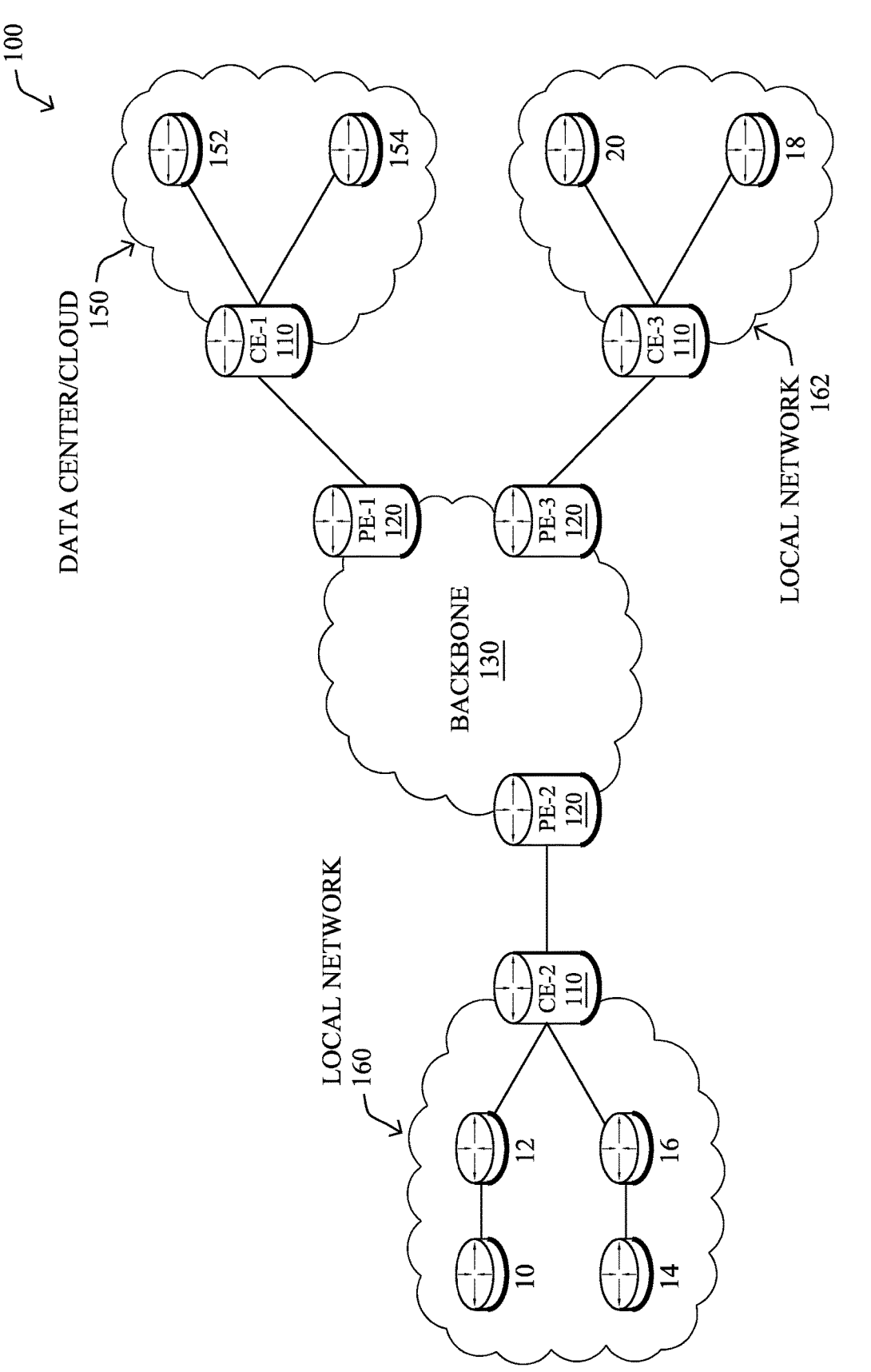

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
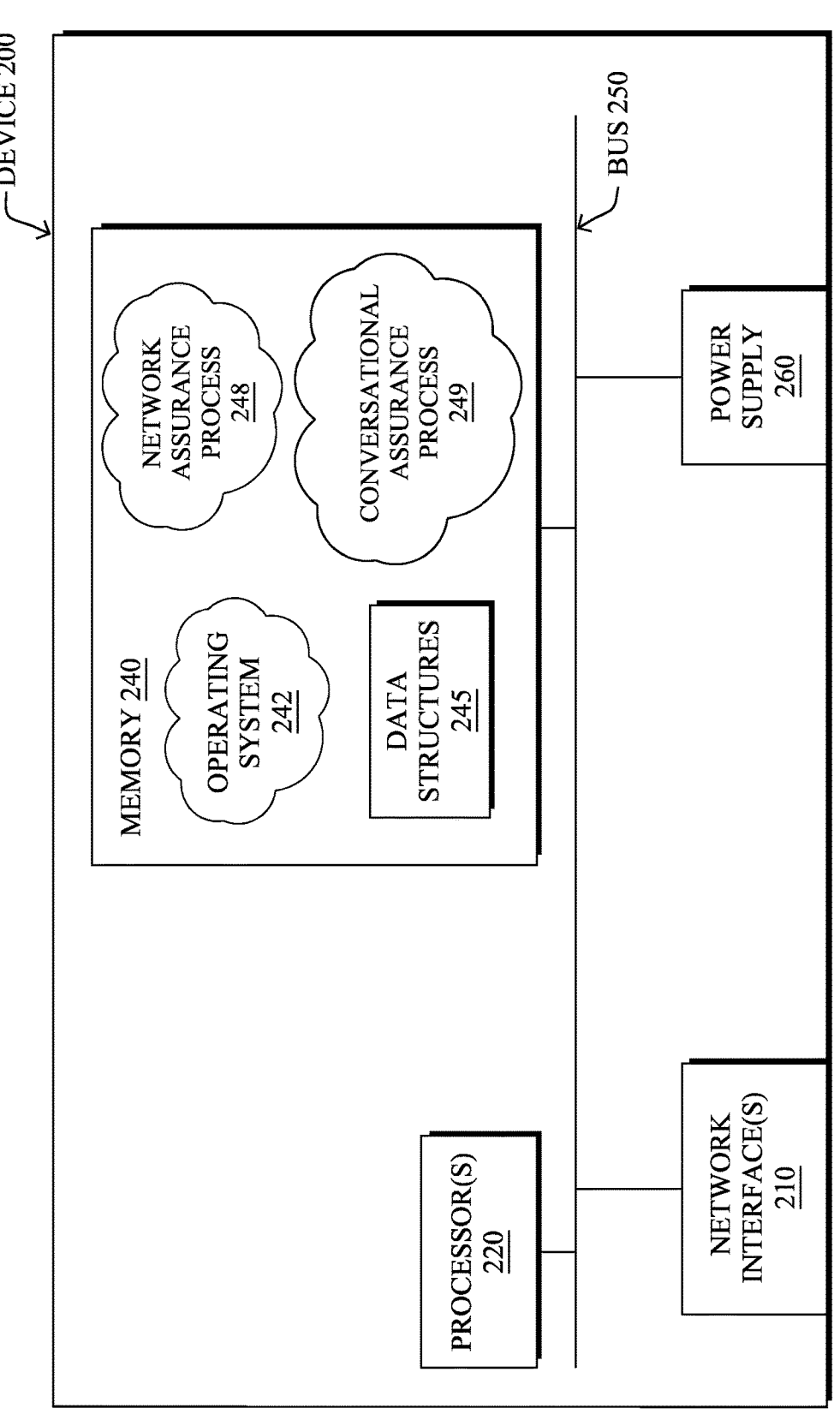
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers

120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248 and/or a conversational assurance process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance service. To evaluate a rule regarding these conditions, the network assurance service may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 and/or a conversational assurance process 249 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 and/or a conversational assurance process 249 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 and/or a conversational assurance process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
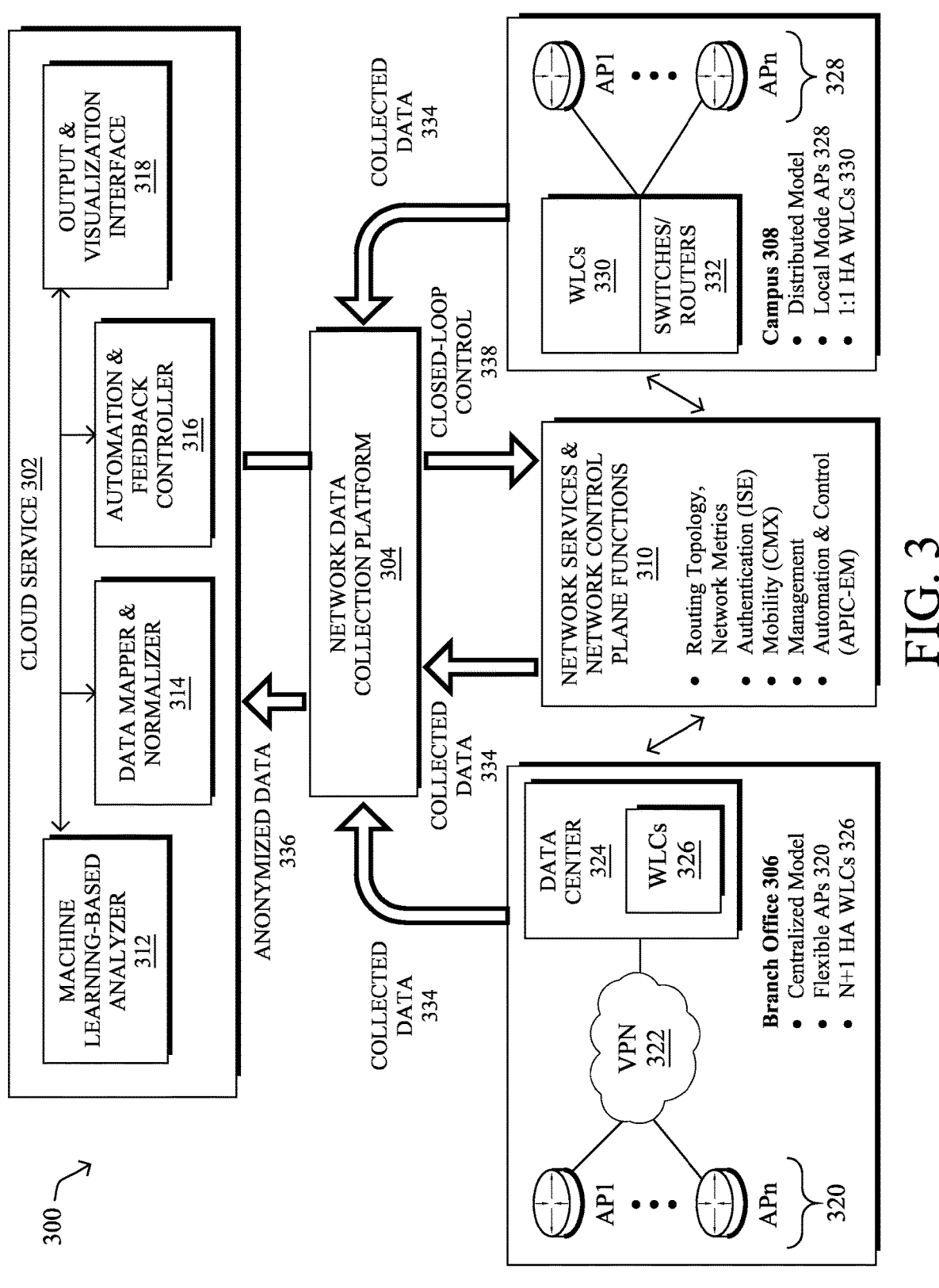
FIG. 3 illustrates an example network assurance system.

FIG. 3 illustrates an example network assurance system 300 (e.g., through execution of network assurance process 248 by one or more devices in a network), according to various embodiments. As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through $n^{th}$ access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through $n^{th}$ access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP) v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong"

clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 302 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, in a traditional network support model, the onus is largely placed on users to identify and report networking issues via a ticketing system. More specifically, when a user encounters a problem (e.g., a lack of connectivity, degraded performance, etc.), the user is then expected to submit a support ticket that is then routed to support personnel for review. Because of the delay in this process, some systems have employed the use of chatbots to walk a user through a series of steps or questions, to help resolve their issue. However, such chatbots are largely based on Natural Language Processing (NLP) and pattern matching, making them very limited in terms of their ability to handle complex queries and queries for which they haven't been explicitly programmed to respond.

Indeed, the NLP capabilities of chatbots and virtual assistants for network assurance today are largely limited to making unstructured search queries possible. Consider, for instance, the following query:

Troubleshoot Client abc-123

Here, the NLP merely consists in allowing the user to use a synonym of "troubleshoot" and matching the right token to some pre-defined filters or commands. For instance, the above query may trigger a search for all issues affecting the client with hostname abc-123. The following would have led to the same outcome:

List Problems for Client abc-123

In practice, the most advanced "AI" capabilities offered by chatbot services such as Tidio are even more limited, as the bot operator must pre-define a list of "likely sentences" that the visitor might say to trigger a pre-defined message.

Recently, however, conversational models based on large language models (LLMs) such as ChatGPT by OpenAI, LaMDA by Google Brain, LLAMA by Meta AI, and Sparrow by DeepMind have significantly raised the bar with respect to users' expectations when interacting with chatbots and virtual assistants. As would be appreciated, LLMs can not only perform complex matches from a semantic perspective, but also generate complex sentences that are not pre-scripted. However, implementing such a conversational model is not straightforward, as networks are highly dynamic, complex systems.

Conversational Network Assurance Using Large Language Models

The techniques herein introduce an architecture that allows for the use of Large Language Models (LLMs) in conjunction with a network assurance service, to aid end users, as well as network support personnel, to identify and resolve network issues. In some aspects, a conversational model is also introduced herein that serves as a gateway between these two sets of users and is able to generate output text that goes beyond simply pre-programmed sentences in a scripted scenario.

Specifically, according to one or more embodiments, a device receives, at a first large language model executed by a device, textual input from a user of a network regarding a networking issue in the network. The device issues, by the first large language model and to a second large language model, one or more questions regarding the network based on the textual input. The device receives, at the first large language model and from the second large language model, one or more answers to the one or more questions. The device generates, by the first large language model, a textual response to the textual input for presentation to the user.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
FIG. 4 illustrates an example architecture for conversational network assurance using large language models.
Figure 4:
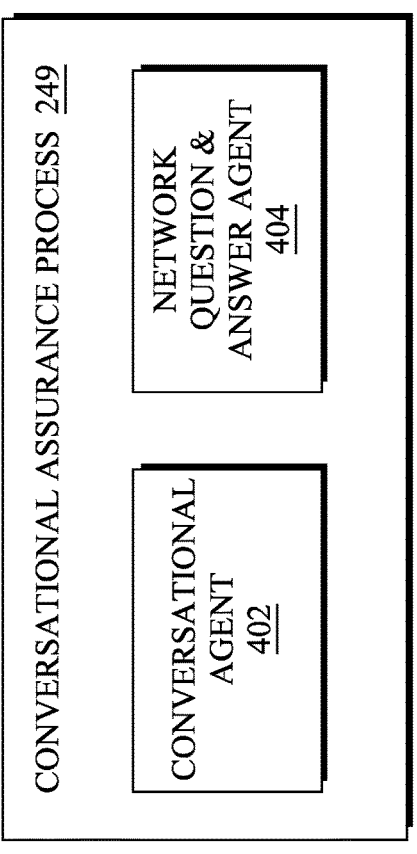

Operationally, FIG. 4 illustrates an example architecture 400 for conversational network assurance using large language models, according to various embodiments. At the core of architecture 400 is conversational assurance process 249, which may be executed by a controller for a network, a networking device, a service, or another device in communication with a network to be monitored. For instance, conversational assurance process 249 may be executed by a controller for a network, a particular networking device in the network (e.g., a router, a firewall, etc.), another device or service in communication therewith, or the like, to perform the techniques herein. In addition, conversational assurance process 249 may be executed in conjunction with network assurance process 248, in some embodiments, as described below.

As shown, application experience optimization process 248 may include any or all of the following components: a conversational agent 402 and a network question and answer agent 404. As would be appreciated, the functionalities of these components may be combined or omitted, as desired. In addition, these components may be implemented on a singular device or in a distributed manner, in which case the combination of executing devices can be viewed as their own singular device for purposes of executing conversational assurance process 249.

According to various embodiments, conversational agent 402 may take the form of a conversational agent, referred to herein as a "Network Assurance AI (NAAI)," based on a suitable language model, such as an LLM. In various embodiments, the NAAI may mediate the chat-based interactions between 1.) end users in the network, 2.) the network itself, and 3.) the network operators/network support personnel. To this end, training of conversational agent 402 can be achieved as follows:

It mediates all exchanges between the users, the network team, and the network itself. To this end, we introduce two key novelties:

1. Train the model of conversational agent 402 to mediate and enrich a conversation between two parties, each composed of possibly multiple people, as opposed to having a dialog with only one person. In this case, the NAAI converses both with one or more users (inquiring about the symptoms they face and the criticality of the problem) and members of the network team (providing insights into the user issue augmented with relevant facts from the network).

2. Instead of limiting the model input to a mere sequence of tokens (i.e., natural language), we also condition its input on the state of the network, and we allow it to issue so-called queries to a second model/agent implemented by network question and answer agent 404, referred to herein as the "Network Question Answerer (NQA)," whose role is to act as form of attention mechanism, as detailed below.

In a primary embodiment, the NAAI implemented by conversational agent 402 may be based on a LLM (e.g., GPT-3, GPT-3.5, etc.) and may be re-trained in multiple phases, such as the following:

1. Train a supervised policy using demonstration data: such data could come from former technical support cases, transcripts from support conversations, and/or one or more existing knowledge bases (e.g., Cisco DNA Center's Machine Reasoning Engine base, existing bot scripting information from the Cisco Networking Bot, the Cisco CX bot, etc.). Here, prompt engineering could be leveraged with model retraining to make the NAAI aware of its persona, i.e., 1.) a first persona used to interact with an end user as a tech support bot or 2.) a second persona used to interact with the network team (e.g., network support personnel) as an assurance service. To this end, all transcripts may be labeled with information distinguishing between the two, such as with a prefix that indicates "User speaking" or "Network engineer speaking" and used in the transcription.

2. Train two reward models, one for each of the two personas above, to rank outputs from best to worse: here, the system may ask both users and network experts (either in live settings or using crowdsourcing) to rank or label sample outputs.

3. Optimize a policy against the reward model obtained in step 2: this step requires a reinforcement learning such as Proximal Policy Optimization.

This initial training phase results in a model that can mediate the conversation between a user and a network team, such as the following interactions:

US 12,683,876 B2

13

TABLE 1

| User-NAAI | Network engineer-NAAI |
|---|---|
| User A> Hello, I am facing some issues with Webex. NAAI> Hello, thanks for reporting your issue. | |
| | NAAI> Hello, User A faces some issues with Webex. Engineer 1> Yes, he is in building X and we currently have an ISP issue. Tell him that this is going to be resolved in 5 minutes. |
| NAAI> Your issue is going to be resolved in 5 minutes. The Internet Service Provider in your area is currently experiencing a disruption. We are sorry for the inconvenience. User A> Thank you. NAAI> You're most welcome. | |

Furthermore, if a second user B asks the same question, the bot could handle it on its own:

TABLE 2

| User-NAAI | Network engineer-NAAI |
|---|---|
| User B> Hello, Webex doesn't work for me. NAAI> Hello, thanks for reporting your issue. Are you located in building X? User B> Yes. NAAI> Other users have reported the same issue, and it should be resolved within a few minutes. The Internet Service Provider in your area is currently experiencing a disruption. We are sorry for the inconvenience. | |

Of course, the notable shortcoming in the above conversation is that the NAAI must ask whether User B is located in building X, which is a piece of information that is easy to obtain from the network itself. Similarly, the following interaction is not possible without access to further information:

TABLE 3

| User-NAAI | Network engineer-NAAI |
|---|---|
| | Engineer 1> Yes, he is in building X and we currently have an ISP issue. Tell him and all other active Webex users in this building that this is going to be resolved in 5 minutes. |

If the bot is to execute such an instruction, it must 1.) list all of the users in the building, and 2.) look up users that have active meetings. This is where the Network Question Answerer (NQA) comes into play.

According to various embodiments, network question and answer agent 404 may take the form of a second LLM or other suitable language model that implements a second agent, the NQA. Like the NAAI, the NQA may also be trained to interact under two different personas:

1. In its first persona, it takes a (natural language) question as input and translate it into a query to be executed against a data warehouse (e.g., a database, datalake, etc.) with a well-defined schema (e.g., using a distributed SQL query engine such as Trino or Presto).
2. In its second persona, it produces an answer based on the query results.

To do so, the NQA may use careful prompt engineering to arrive at an acceptable performance as follows:

when the first persona generates an incorrect query, the same question is asked again, but prefixed with the error message to allow the model to refine its query.

the second persona is not provided the query results alone, but the initial question and the resulting query from the first persona.

Although two personas are considered, it should be noted that that the NQA is a single model, and its behavior depends on the prompt. In the initial demonstration (supervised) phase, personas cannot be trained end-to-end as SQL queries are, of course, non-differentiable. However, they can be trained in a collaborative manner: for a given demonstration (i.e., pair of question/answer), the model is first asked to produce a SQL query based on the question, then an answer based on the query outcome, and the resulting loss is backpropagated twice. The initial demonstration phase is then followed by training a reward model, and a reinforcement learning phase.

In various embodiments, the techniques herein also introduce a mechanism whereby the NAAI (agent 402) and the NQA (agent 404) are jointly fine-tuned to operate together. More specifically, the NAAI may be modified to operate in two steps:

1. Given an input (either as persona "User-facing" or "Operator-facing"), it is first allowed to generate a query to the NQA.
2. The input and the answer of the NQA are then passed to the NAAI to generate the final output.

Again, this procedure being non-differentiable, the system may employ a collaborative training strategy whereby the NQA and the NAAI are fine-tuned separately on a joint loss obtained from a reward model trained by human labelers.

Optionally, in some embodiments, the NAAI may also be configured to be proactive by receiving triggers from a network assurance service. These triggers may take the form of structured alerts that resemble logs, which may cause the NAAI to engage either with the network team or the end users, depending on the situation. For instance, if a violation of the voice QoS template on the SD-WAN router of Building X is observed, and no re-routing is possible, the NAAI could proactively reach out to users that are actively using voice applications (e.g., Webex) and inform the network team that it has done so.

Similar to previous components, this capability would require some demonstration to become effective, although in-context learning (ICL) could prove quite effective here, for instance by crafting some instruction with the input:

If relevant, inform active users of application X that the QoS requirement on the WAN uplink of building X is not met.

Inform the on-call network engineers that users impacted by the following issue have been notified: <log message>.

This type of "augmented" prompt not only contains the details necessary for the NAAI to identify the users, the severity of the problem (from the log message, etc.), and the type of application, but it also explicitly instructs the model to notify active users (i.e., not all of them) of a given application, and only if relevant (i.e., accounting for their preference, which they might have expressed in previous conversations).

Figure 5:
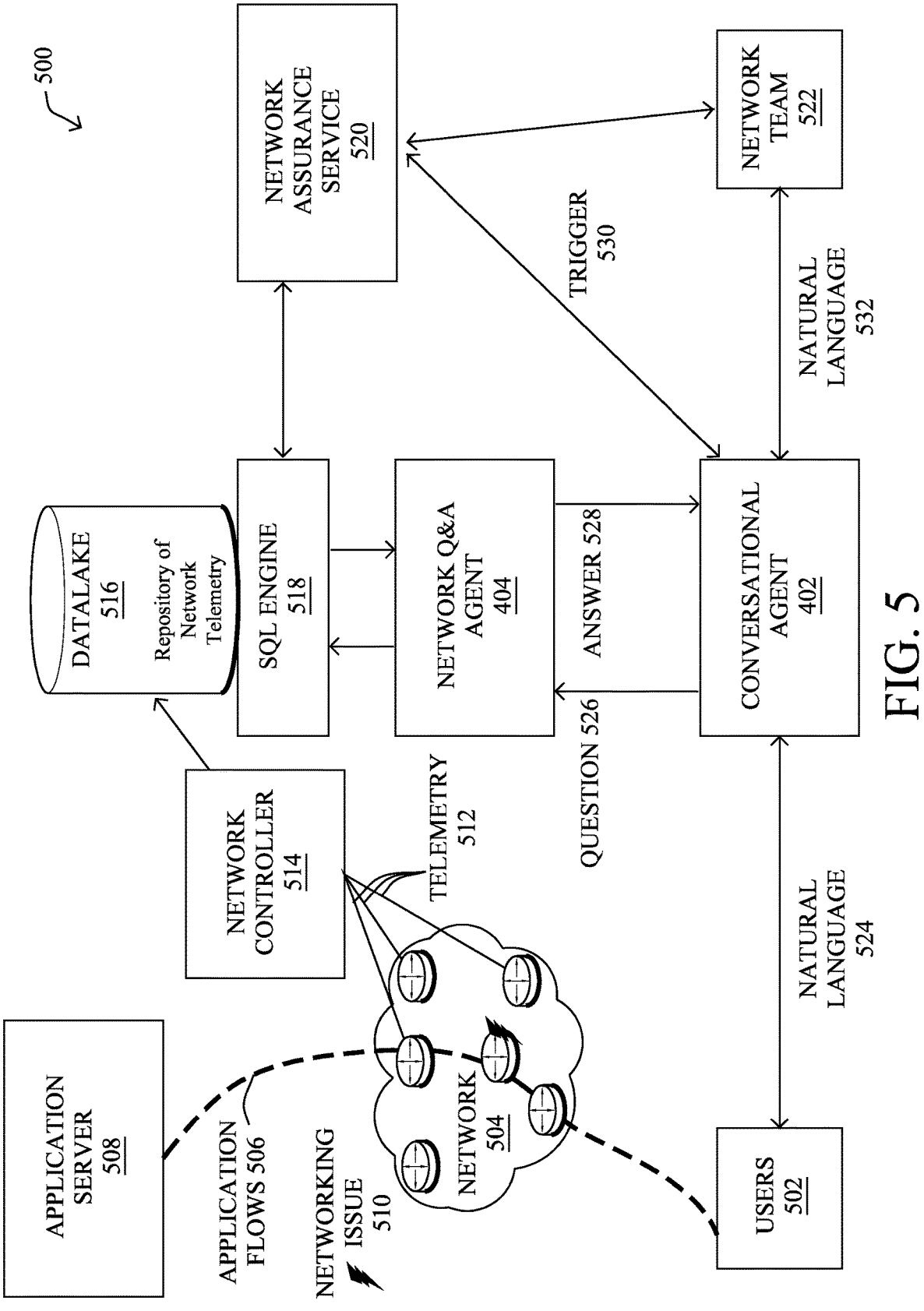
FIG. 5 illustrates an example of conversational network assurance being performed in a network.

FIG. 5 illustrates an example 500 of conversational network assurance being performed in a network, according to various embodiments. As shown, assume that end users 502 operate their respective devices to send applications flows 506 to and from an application server 508 via a network 504.

In such a case, using the techniques described herein previously, various telemetry collection mechanisms may collect telemetry 512 regarding operation of the network and report it to a network controller 514 that then stores the collected telemetry 512 in a datalake 516.

When a networking issue 510 occurs, a given user among users 502 may issue natural language 524 to conversational agent 402 (the NAAI) as textual input regarding networking issue 510. Note that such textual input may be unstructured and may also range from being very specific to being very generic in nature.

In turn, the NAAI may assess the textual input and formulate one or more questions 526 for evaluation by network question and answer agent 404 (the NQA). The NQA may then translate the one or more questions 526 into suitable database queries, such as SQL queries for processing by a SQL engine 518 associated with datalake 516. Then, the SQA may formulate one or more answers 528 and provide them back to the NAAI, which generates a textual response for presentation back to that user among users 502.

For example, below illustrates such operations:

TABLE 4

| User-NAAI | NAAI-NQA |
|---|---|
| User B> Hello, Webex doesn't work for me. | |
| | NAAI> Where is user B located? |
| | NQA> Building X |
| | NAAI> How many active Webex users are in Building X? |
| | NQA> 15 |
| | NAAI> Is there an active incident opened for Webex in building X? |
| | NQA> Yes, the reference is INC-24825812. |
| NAAI> Hello to you! You are in Building X, where an outage is currently on-going, affecting 15 other users. We are actively working on this issue (see INC-24825812). Sorry for the inconvenience! Is this information inaccurate? Click here to talk to a human. | |

Note the last message, which serves as both a warning to the user that he is talking to a machine and triggers a demonstration with a human expert. Upon clicking on this link, the NAAI hands over the chat to a human expert, who may: 1.) ask the user what is incorrect, and 2.) demonstrate the correct answer. Note that the demonstration may consist in generating the correct prompt to the NQA (thus correcting only the NAAI) or generating the correct SQL query to the data warehouse (thus correcting both the NAAI and the NQA).

As noted, both the NAAI and the NQA (agents 402-404) may also be trained to exhibit dual personals. Thus, the network support team 522 for network 504 may also interact with the NAAI in a similar manner using natural language 532 to garner insights into the operations of network 504.

In addition, in some embodiments, a network assurance service 520 could also interface with the NAAI (agent 402) and provide a trigger 530 thereto, prompting it to initiate an interaction with users 502 and/or network support team 522. For instance, assume that networking issue 510 is due to a particular router going down in network 504. In such a case, network assurance service 520 may identify the cause of the issue, report it to the NAAI via trigger 530, which then alerts network support team 522, accordingly.

Figure 6:
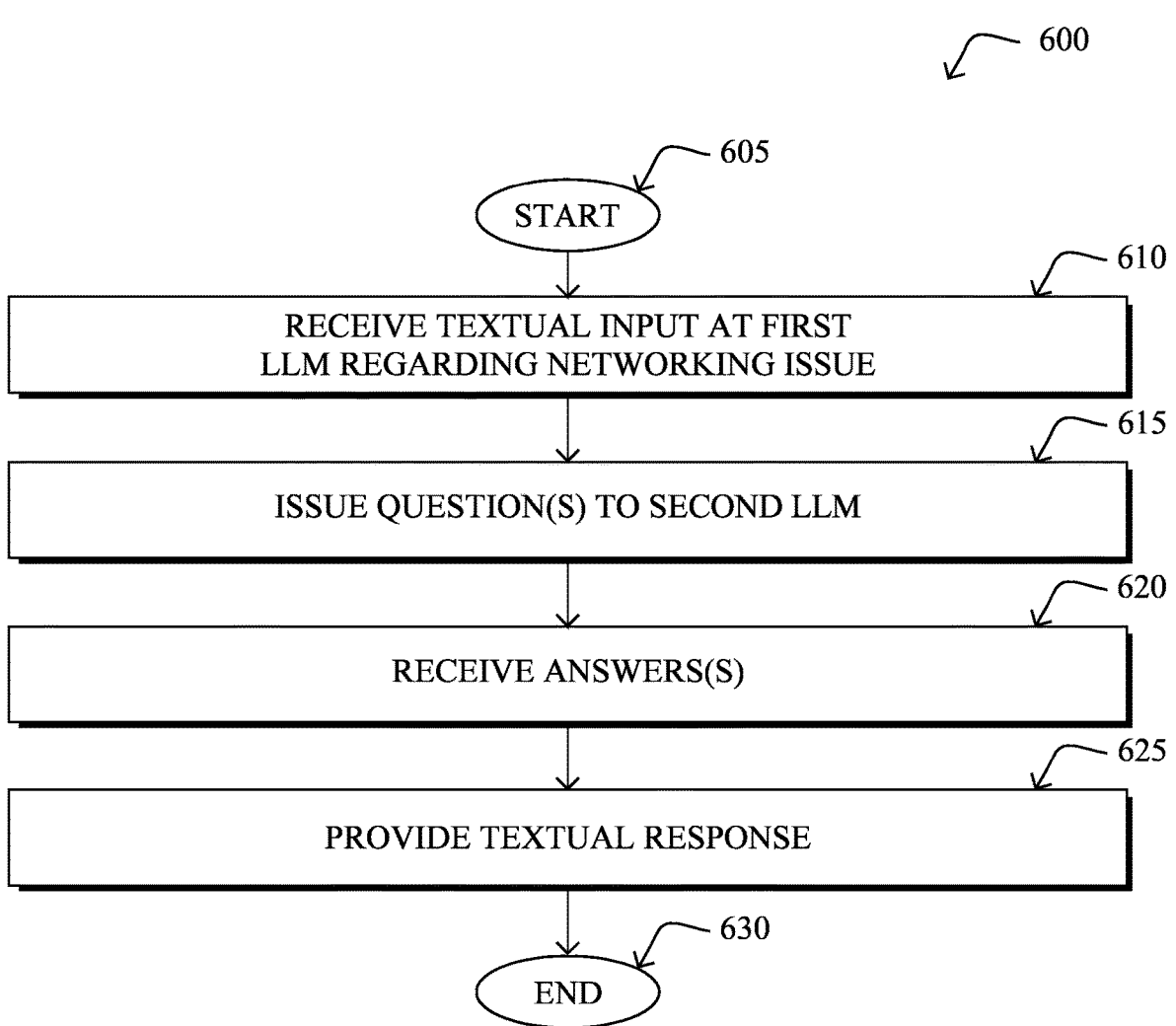
FIG. 6 illustrates an example simplified procedure for conversational network assurance using large language models.

FIG. 6 illustrates an example simplified procedure (e.g., a method) for conversational network assurance using large language models, in accordance with one or more embodiments described herein. For example, a non-generic, specifically configured device (e.g., device 200) may perform procedure 600 by executing stored instructions (e.g., process 248 and/or process 249). The procedure 600 may start at step 605, and continues to step 610, where, as described in greater detail above, the device may receive, at a first large language model executed by a device, textual input from a user of a network regarding a networking issue in the network. In various embodiments, the first large language model acts as an intermediate chat model between the user and one or more network support personnel. In one embodiment, the device may also initiate, by the first large language model, a chat session with the user, in response to an alert received by the first large language model from a network assurance service for the network. In some embodiments, the first large language model is trained in part by asking end users to rank or label sample textual outputs of the first large language model. In one embodiment, the first large language model is trained to interact differently with end users and network support personnel.

At step 615, as detailed above, the device may issue, by the first large language model and to a second large language model, one or more questions regarding the network based on the textual input. In various embodiments, the one or more questions query at least one of: a location of an endpoint in the network operated by the user or an application accessed by the user via the network.

At step 620, the device may receive, at the first large language model and from the second large language model, one or more answers to the one or more questions, as described in greater detail above. In various embodiments, the second large language model generates the one or more answers based on telemetry collected from the network. In one embodiment, the second large language model generates the one or more answers to the one or more questions by converting the one or more questions into database queries.

At step 625, as detailed above, the device may generate, by the first large language model, a textual response to the textual input for presentation to the user. In some embodiments, the textual response includes a request that the user confirm validity of information included in the textual response based on the one or more answers. In such a case, the device may also connect, by the first large language model, the user to the one or more network support personnel when the user does not confirm the validity of the information.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for conversational network assurance using large language models, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a first large language model executed by a device, textual input from a user of a network regarding a networking issue in the network, the first large language model being trained based on previous conversations with users regarding network issues;

generating, based on the textual input, one or more natural language questions regarding the network;

issuing, by the first large language model and to a second large language model distinct from the first large language model, the one or more natural language questions, wherein the second large language model is trained to semantically parse the one or more natural language questions and generate one or more corresponding structured database queries;

receiving, at the first large language model and from the second large language model, one or more answers to the one or more natural language questions, the one or more answers being generated based on one or more database responses, to the one or more structured database queries, that relate to telemetry data collected from the network; and generating, by the first large language model and based on the one or more answers, a textual response to the textual input for presentation to the user, the textual response including a response regarding the networking issue.

2. The method as in claim 1, wherein the first large language model acts as an intermediate chat model between the user and one or more network support personnel.

3. The method as in claim 2, wherein the textual response includes a request that the user confirm validity of information included in the textual response based on the one or more answers, and wherein the method further comprises:

connecting, by the first large language model, the user to the one or more network support personnel when the user does not confirm the validity of the information.

4. The method as in claim 1, wherein the one or more natural language questions query at least one of: a location of an endpoint in the network operated by the user or an application accessed by the user via the network.

5. The method as in claim 1, further comprising:

initiating, by the first large language model, a chat session with the user, in response to an alert received by the first large language model from a network assurance service for the network.

6. The method as in claim 1, wherein the first large language model is trained in part by asking end users to rank or label sample textual outputs of the first large language model.

7. The method as in claim 1, wherein the first large language model is trained to interact differently with end users and network support personnel.

8. The method as in claim 1, further comprising:

providing, by the device, the one or more natural language questions and the one or more answers for display.

9. The method of claim 1, wherein the second large language model is trained to semantically parse the one or more natural language questions and generate one or more corresponding structured database queries according to a known schema.

10. The method of claim 1, wherein the one or more corresponding structured database queries comprise SQL queries.

11. An apparatus, comprising:

one or more network interfaces;

a processor coupled to the one or more network interfaces; and a memory configured to store instructions that, when executed by the processor, configure the processor to:

receive, at a first large language model executed by a device, textual input from a user of a network regarding a networking issue in the network, the first large language model being trained based on previous conversations with users regarding network issues;

generate, based on the textual input, one or more natural language questions regarding the network;

issue, by the first large language model and to a second large language model distinct from the first large language model, the one or more natural language questions, wherein the second large language model is trained to semantically parse the one or more natural language questions and generate one or more corresponding structured database queries;

receive, at the first large language model and from the second large language model, one or more answers to the one or more natural language questions, the one or more answers being generated based on one or more database responses, to the one or more structured database queries, that relate to telemetry data collected from the network; and generate, by the first large language model and based on the one or more answers, a textual response to the textual input for presentation to the user, the textual response including a response regarding the networking issue.

12. The apparatus as in claim 11, wherein the first large language model acts as an intermediate chat model between the user and one or more network support personnel.

13. The apparatus as in claim 12, wherein the textual response includes a request that the user confirm validity of information included in the textual response based on the one or more answers, and wherein the processor is further configured to:

connect, by the first large language model, the user to the one or more network support personnel when the user does not confirm the validity of the information.

14. The apparatus as in claim 11, wherein the one or more natural language questions query at least one of: a location of an endpoint in the network operated by the user or an application accessed by the user via the network.

15. The apparatus as in claim 11, wherein the processor is further configured to:

initiate, by the first large language model, a chat session with the user, in response to an alert received by the first large language model from a network assurance service for the network.

16. The apparatus as in claim 11, wherein the first large language model is trained in part by asking end users to rank or label sample textual outputs of the first large language model.

17. The apparatus as in claim 11, wherein the first large language model is trained to interact differently with end users and network support personnel.

18. The apparatus as in claim 11, wherein the second large language model is trained to semantically parse the one or more natural language questions and generate one or more corresponding structured database queries according to a predetermined schema.

19. The apparatus as in claim 11, wherein the one or more corresponding structured database queries comprise one or more SQL queries.

20. A tangible, non-transitory, computer-readable medium storing program instructions that cause a device to execute a process comprising:

receiving, at a first large language model executed by the device, textual input from a user of a network regarding a networking issue in the network, the first large language model being trained based on previous conversations with users regarding network issues;

generating, based on the textual input, one or more natural language questions regarding the network;

issuing, by the first large language model and to a second large language model distinct from the first large language model, the one or more natural language questions, wherein the second large language model is configured to semantically parse the one or more natural language questions and generate one or more corresponding structured database queries;

receiving, at the first large language model and from the second large language model, one or more answers to the one or more natural language questions, the one or more answers being based on one or more database responses, to the one or more structured database queries, that relate to telemetry data collected from the network; and generating, by the first large language model and based on the one or more answers, a textual response to the textual input for presentation to the user, the textual response including a response regarding the networking issue.

* * * * *